(12) United States Patent
Lee et al.

(10) Patent No.: US 11,330,384 B2
(45) Date of Patent: May 10, 2022

(54) ARTIFICIAL INTELLIGENCE DEVICE FOR DIAGNOSING FAILURE AND METHOD THEREOF

(71) Applicant: LG ELECTRONICS INC., Seoul (KR)

(72) Inventors: Junmin Lee, Seoul (KR); Inho Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 163 days.

(21) Appl. No.: 16/707,102

(22) Filed: Dec. 9, 2019

(65) Prior Publication Data

US 2021/0144497 A1 May 13, 2021

(30) Foreign Application Priority Data

Nov. 8, 2019 (KR) .................. 10-2019-0142874

(51) Int. Cl.
| | |
|---|---|
| *G10L 21/0232* | (2013.01) |
| *H04R 1/40* | (2006.01) |
| *G10L 25/18* | (2013.01) |
| *G06N 3/04* | (2006.01) |
| *H04R 3/00* | (2006.01) |
| *H04R 29/00* | (2006.01) |
| *G06N 3/08* | (2006.01) |
| *G10L 21/0208* | (2013.01) |

(52) U.S. Cl.
CPC .......... *H04R 29/005* (2013.01); *G06N 3/04* (2013.01); *G06N 3/08* (2013.01); *G10L 21/0232* (2013.01); *G10L 25/18* (2013.01); *H04R 1/406* (2013.01); *H04R 3/005* (2013.01); *G10L 2021/02082* (2013.01)

(58) Field of Classification Search
CPC ...... H04R 29/005; H04R 1/406; H04R 3/005; H04R 29/001; H04R 29/004; H04R 29/00; H04R 1/028; G10L 21/0232; G10L 25/18; G10L 2021/02082; G10L 21/0208; G10L 25/51; G06N 3/08; G06N 3/04; G08B 21/182
See application file for complete search history.

(56) References Cited

U.S. PATENT DOCUMENTS

| | | | | |
|---|---|---|---|---|
| 7,046,798 | B2 * | 5/2006 | Betts | H04L 5/1484 370/201 |
| 2011/0045781 | A1 * | 2/2011 | Shellhammer | H04B 17/26 455/67.11 |
| 2012/0148057 | A1 * | 6/2012 | Beerends | G10L 25/69 381/56 |
| 2016/0066089 | A1 * | 3/2016 | Klein | H04R 3/002 381/94.2 |
| 2017/0289682 | A1 * | 10/2017 | Goesnar | H04R 3/04 |
| 2021/0211546 | A1 * | 7/2021 | Satomi | H04B 3/20 |

\* cited by examiner

*Primary Examiner* — Oyesola C Ojo
(74) *Attorney, Agent, or Firm* — Birch, Stewart, Kolasch & Birch, LLP

(57) ABSTRACT

Disclosed herein is an artificial intelligence device including a communication interface configured to receive a reference signal in a time domain for echo cancellation of an external device and a processor configured to determine whether a spectral density at at least one test target frequency is less than or equal to a preset spectral density reference value at at least one test target time point and determine that a failure occurs in an audio component when the spectral density is less than or equal to the preset spectral density reference value.

18 Claims, 11 Drawing Sheets

(a)

(b)

ARTIFICIAL INTELLIGENCE DEVICE FOR DIAGNOSING FAILURE AND METHOD THEREOF

CROSS-REFERENCE TO RELATED APPLICATIONS

This application claims priority to Korean Patent Application No. 10-2019-0142874 filed on Nov. 8, 2019 in Korea, the entire contents of which is hereby incorporated by reference in its entirety.

BACKGROUND OF THE INVENTION

1. Field of the Invention

The present disclosure relates to an artificial intelligence device for diagnosing a failure of an external device and a method thereof.

2. Discussion of the Related Art

Artificial intelligence is a field of computer engineering and information technology for researching a method of enabling a computer to do thinking, learning and self-development that can be done by human intelligence, and means that a computer can imitate a human intelligent action.

In addition, artificial intelligence does not exist in itself but has many direct and indirect associations with the other fields of computer science. In particular, today, attempts to introduce artificial intelligent elements to various fields of information technology to deal with issues of the fields have been actively made.

Meanwhile, technology for recognizing and learning a surrounding situation using artificial intelligence and providing information desired by a user in a desired form or performing a function or operation desired by the user is actively being studied.

An electronic device for providing such operations and functions may be referred to as an artificial intelligence device.

On the other hand, a robot that recognizes human speech and gives help is increasing in recent years.

However, when a defect occurs in a microphone or an audio board of the robot, there is a problem that speech recognition is not performed.

In this case, an expert needs to collect a robot and make a diagnosis to identify a component in which the defect occurs in the robot and a cause of the defect.

Therefore, there is an increasing need for an artificial intelligence device capable of diagnose a failure of a robot.

SUMMARY OF THE INVENTION

The present disclosure aims to solve the above and other problems.

The present disclosure aims to provide an artificial intelligence device for remotely making a diagnosis with a microphone or an audio component.

The present disclosure aims to provide an artificial intelligence device for guiding measures for resolving a failure of a microphone or an audio component.

The present disclosure aims to provide an artificial intelligence device for diagnosing a failure of a robot's microphone or audio component and guiding measures for resolving the failure by using a signal obtained by again recording an audio signal output through a speaker of the robot.

According to an embodiment of the present disclosure, an artificial intelligence device includes a communication interface configured to receive a reference signal in a time domain for echo cancellation of an external device and a processor configured to determine whether a spectral density at at least one test target frequency is less than or equal to a preset spectral density reference value at at least one test target time point and determine that a failure occurs in an audio component when the spectral density is less than or equal to the preset spectral density reference value.

Furthermore, according to another embodiment of the present disclosure, a method of diagnosing a failure includes receiving a reference signal in a time domain for echo cancellation of an external device, determining whether a spectral density at at least one test target frequency is less than or equal to a preset spectral density reference value at at least one test target time point, and determining that a failure occurs in an audio component when the spectral density is less than or equal to the preset spectral density reference value.

DETAILED DESCRIPTION OF THE PREFERRED EMBODIMENTS

Figure 1:
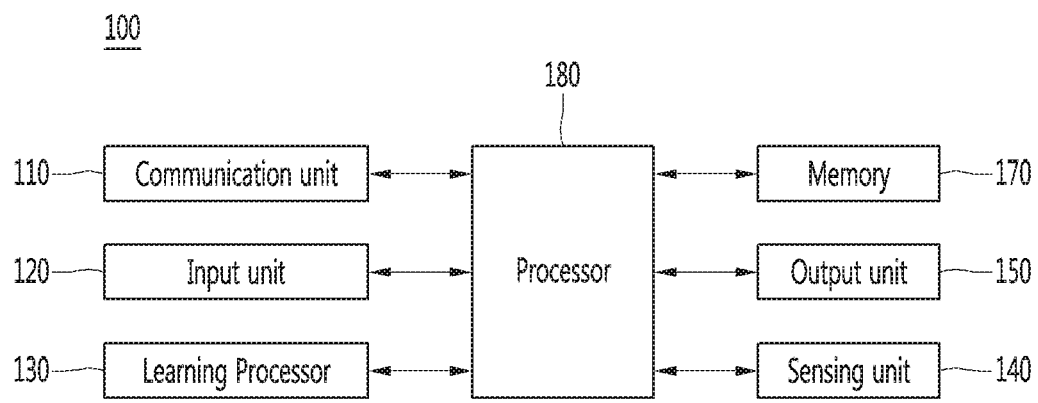
FIG. 1 illustrates an AI device according to an embodiment of the present disclosure.

Hereinafter, embodiments of the present disclosure are described in more detail with reference to accompanying drawings and regardless of the drawings symbols, same or similar components are assigned with the same reference numerals and thus overlapping descriptions for those are omitted. The suffixes "module" and "unit" for components used in the description below are assigned or mixed in consideration of easiness in writing the specification and do not have distinctive meanings or roles by themselves. In the following description, detailed descriptions of well-known functions or constructions will be omitted since they would obscure the invention in unnecessary detail. Additionally, the accompanying drawings are used to help easily understanding embodiments disclosed herein but the technical idea of the present disclosure is not limited thereto. It should be understood that all of variations, equivalents or substitutes contained in the concept and technical scope of the present disclosure are also included.

It will be understood that the terms "first" and "second" are used herein to describe various components but these components should not be limited by these terms. These terms are used only to distinguish one component from other components.

In this disclosure below, when one part (or element, device, etc.) is referred to as being 'connected' to another part (or element, device, etc.), it should be understood that the former can be 'directly connected' to the latter, or 'electrically connected' to the latter via an intervening part (or element, device, etc.). It will be further understood that when one component is referred to as being 'directly connected' or 'directly linked' to another component, it means that no intervening component is present.

<Artificial Intelligence (AI)>

Artificial intelligence refers to the field of studying artificial intelligence or methodology for making artificial intelligence, and machine learning refers to the field of defining various issues dealt with in the field of artificial intelligence and studying methodology for solving the various issues. Machine learning is defined as an algorithm that enhances the performance of a certain task through a steady experience with the certain task.

An artificial neural network (ANN) is a model used in machine learning and may mean a whole model of problem-solving ability which is composed of artificial neurons (nodes) that form a network by synaptic connections. The artificial neural network can be defined by a connection pattern between neurons in different layers, a learning process for updating model parameters, and an activation function for generating an output value.

The artificial neural network may include an input layer, an output layer, and optionally one or more hidden layers. Each layer includes one or more neurons, and the artificial neural network may include a synapse that links neurons to neurons. In the artificial neural network, each neuron may output the function value of the activation function for input signals, weights, and deflections input through the synapse.

Model parameters refer to parameters determined through learning and include a weight value of synaptic connection and deflection of neurons. A hyperparameter means a parameter to be set in the machine learning algorithm before learning, and includes a learning rate, a repetition number, a mini batch size, and an initialization function.

The purpose of the learning of the artificial neural network may be to determine the model parameters that minimize a loss function. The loss function may be used as an index to determine optimal model parameters in the learning process of the artificial neural network.

Machine learning may be classified into supervised learning, unsupervised learning, and reinforcement learning according to a learning method.

The supervised learning may refer to a method of learning an artificial neural network in a state in which a label for learning data is given, and the label may mean the correct answer (or result value) that the artificial neural network must infer when the learning data is input to the artificial neural network. The unsupervised learning may refer to a method of learning an artificial neural network in a state in which a label for learning data is not given. The reinforcement learning may refer to a learning method in which an agent defined in a certain environment learns to select a behavior or a behavior sequence that maximizes cumulative compensation in each state.

Machine learning, which is implemented as a deep neural network (DNN) including a plurality of hidden layers among artificial neural networks, is also referred to as deep learning, and the deep learning is part of machine learning. In the following, machine learning is used to mean deep learning.

<Robot>

A robot may refer to a machine that automatically processes or operates a given task by its own ability. In particular, a robot having a function of recognizing an environment and performing a self-determination operation may be referred to as an intelligent robot.

Robots may be classified into industrial robots, medical robots, home robots, military robots, and the like according to the use purpose or field.

The robot includes a driving unit may include an actuator or a motor and may perform various physical operations such as moving a robot joint. In addition, a movable robot may include a wheel, a brake, a propeller, and the like in a driving unit, and may travel on the ground through the driving unit or fly in the air.

<Self-Driving>

Self-driving refers to a technique of driving for oneself, and a self-driving vehicle refers to a vehicle that travels without an operation of a user or with a minimum operation of a user.

For example, the self-driving may include a technology for maintaining a lane while driving, a technology for automatically adjusting a speed, such as adaptive cruise control, a technique for automatically traveling along a predetermined route, and a technology for automatically setting and traveling a route when a destination is set.

The vehicle may include a vehicle having only an internal combustion engine, a hybrid vehicle having an internal combustion engine and an electric motor together, and an electric vehicle having only an electric motor, and may include not only an automobile but also a train, a motorcycle, and the like.

At this time, the self-driving vehicle may be regarded as a robot having a self-driving function.

<eXtended Reality (XR)>

Extended reality is collectively referred to as virtual reality (VR), augmented reality (AR), and mixed reality (MR). The VR technology provides a real-world object and background only as a CG image, the AR technology provides a virtual CG image on a real object image, and the MR technology is a computer graphic technology that mixes and combines virtual objects into the real world.

The MR technology is similar to the AR technology in that the real object and the virtual object are shown together. However, in the AR technology, the virtual object is used in the form that complements the real object, whereas in the MR technology, the virtual object and the real object are used in an equal manner.

The XR technology may be applied to a head-mount display (HMD), a head-up display (HUD), a mobile phone, a tablet PC, a laptop, a desktop, a TV, a digital signage, and the like. A device to which the XR technology is applied may be referred to as an XR device.

FIG. 1 illustrates an AI device 100 according to an embodiment of the present invention.

The AI device (or an AI apparatus) 100 may be implemented by a stationary device or a mobile device, such as a TV, a projector, a mobile phone, a smartphone, a desktop computer, a notebook, a digital broadcasting terminal, a personal digital assistant (PDA), a portable multimedia player (PMP), a navigation device, a tablet PC, a wearable device, a set-top box (STB), a DMB receiver, a radio, a washing machine, a refrigerator, a desktop computer, a digital signage, a robot, a vehicle, and the like.

Referring to FIG. 1, the AI device 100 may include a communication unit 110, an input unit 120, a learning processor 130, a sensing unit 140, an output unit 150, a memory 170, and a processor 180.

The communication unit 110 may transmit and receive data to and from external devices such as other AI devices 100a to 100e and the AI server 200 by using wire/wireless communication technology. For example, the communication unit 110 may transmit and receive sensor information, a user input, a learning model, and a control signal to and from external devices.

The communication technology used by the communication unit 110 includes GSM (Global System for Mobile communication), CDMA (Code Division Multi Access), LTE (Long Term Evolution), 5G, WLAN (Wireless LAN), Wi-Fi (Wireless-Fidelity), Bluetooth™, RFID (Radio Frequency Identification), Infrared Data Association (IrDA), ZigBee, NFC (Near Field Communication), and the like.

The input unit 120 may acquire various kinds of data.

At this time, the input unit 120 may include a camera for inputting a video signal, a microphone for receiving an audio signal, and a user input unit for receiving information from a user. The camera or the microphone may be treated as a sensor, and the signal acquired from the camera or the microphone may be referred to as sensing data or sensor information.

The input unit 120 may acquire a learning data for model learning and an input data to be used when an output is acquired by using learning model. The input unit 120 may acquire raw input data. In this case, the processor 180 or the learning processor 130 may extract an input feature by preprocessing the input data.

The learning processor 130 may learn a model composed of an artificial neural network by using learning data. The learned artificial neural network may be referred to as a learning model. The learning model may be used to an infer result value for new input data rather than learning data, and the inferred value may be used as a basis for determination to perform a certain operation.

At this time, the learning processor 130 may perform AI processing together with the learning processor 240 of the AI server 200.

At this time, the learning processor 130 may include a memory integrated or implemented in the AI device 100. Alternatively, the learning processor 130 may be implemented by using the memory 170, an external memory directly connected to the AI device 100, or a memory held in an external device.

The sensing unit 140 may acquire at least one of internal information about the AI device 100, ambient environment information about the AI device 100, and user information by using various sensors.

Examples of the sensors included in the sensing unit 140 may include a proximity sensor, an illuminance sensor, an acceleration sensor, a magnetic sensor, a gyro sensor, an inertial sensor, an RGB sensor, an IR sensor, a fingerprint recognition sensor, an ultrasonic sensor, an optical sensor, a microphone, a lidar, and a radar.

The output unit 150 may generate an output related to a visual sense, an auditory sense, or a haptic sense.

At this time, the output unit 150 may include a display unit for outputting time information, a speaker for outputting auditory information, and a haptic module for outputting haptic information.

The memory 170 may store data that supports various functions of the AI device 100. For example, the memory 170 may store input data acquired by the input unit 120, learning data, a learning model, a learning history, and the like.

The processor 180 may determine at least one executable operation of the AI device 100 based on information determined or generated by using a data analysis algorithm or a machine learning algorithm. The processor 180 may control the components of the AI device 100 to execute the determined operation.

To this end, the processor 180 may request, search, receive, or utilize data of the learning processor 130 or the memory 170. The processor 180 may control the components of the AI device 100 to execute the predicted operation or the operation determined to be desirable among the at least one executable operation.

When the connection of an external device is required to perform the determined operation, the processor 180 may generate a control signal for controlling the external device and may transmit the generated control signal to the external device.

The processor 180 may acquire intention information for the user input and may determine the user's requirements based on the acquired intention information.

The processor 180 may acquire the intention information corresponding to the user input by using at least one of a speech to text (STT) engine for converting speech input into a text string or a natural language processing (NLP) engine for acquiring intention information of a natural language.

At least one of the STT engine or the NLP engine may be configured as an artificial neural network, at least part of which is learned according to the machine learning algorithm. At least one of the STT engine or the NLP engine may be learned by the learning processor 130, may be learned by the learning processor 240 of the AI server 200, or may be learned by their distributed processing.

The processor 180 may collect history information including the operation contents of the AI apparatus 100 or the user's feedback on the operation and may store the collected history information in the memory 170 or the learning processor 130 or transmit the collected history information to the external device such as the AI server 200. The collected history information may be used to update the learning model.

The processor 180 may control at least part of the components of AI device 100 so as to drive an application program stored in memory 170. Furthermore, the processor 180 may operate two or more of the components included in the AI device 100 in combination so as to drive the application program.

Figure 2:
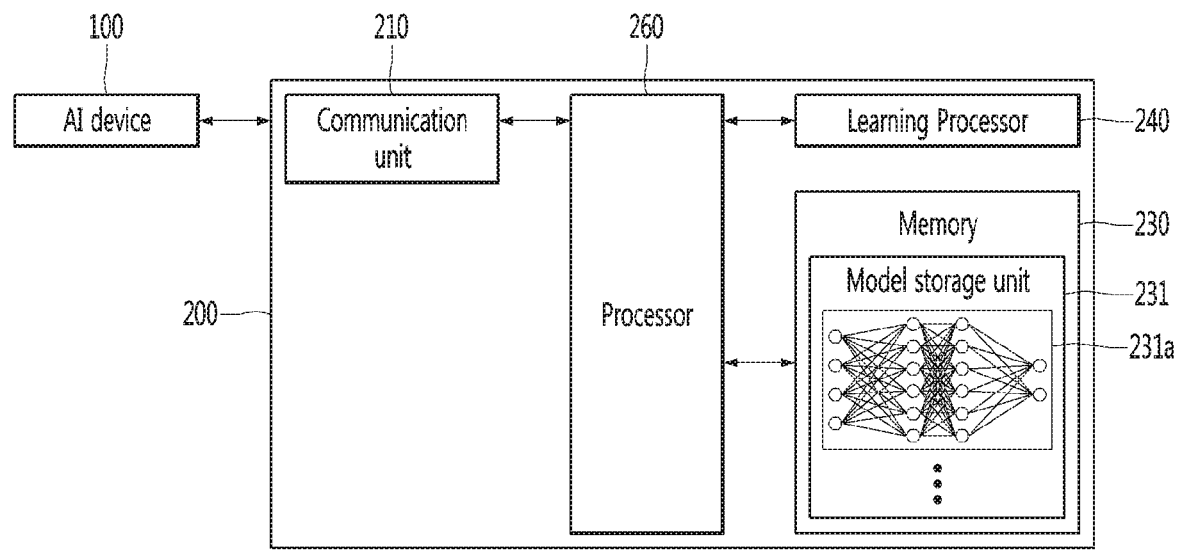
FIG. 2 illustrates an AI server according to an embodiment of the present disclosure.

FIG. 2 illustrates an AI server 200 according to an embodiment of the present invention.

Referring to FIG. 2, the AI server 200 may refer to a device that learns an artificial neural network by using a machine learning algorithm or uses a learned artificial neural network. The AI server 200 may include a plurality of servers to perform distributed processing, or may be defined as a 5G network. At this time, the AI server 200 may be included as a partial configuration of the AI device 100, and may perform at least part of the AI processing together.

The AI server 200 may include a communication unit 210, a memory 230, a learning processor 240, a processor 260, and the like.

The communication unit 210 can transmit and receive data to and from an external device such as the AI device 100.

The memory 230 may include a model storage unit 231. The model storage unit 231 may store a learning or learned model (or an artificial neural network 231a) through the learning processor 240.

The learning processor 240 may learn the artificial neural network 231a by using the learning data. The learning model may be used in a state of being mounted on the AI server 200 of the artificial neural network, or may be used in a state of being mounted on an external device such as the AI device 100.

The learning model may be implemented in hardware, software, or a combination of hardware and software. If all or part of the learning models are implemented in software, one or more instructions that constitute the learning model may be stored in memory 230.

The processor 260 may infer the result value for new input data by using the learning model and may generate a response or a control command based on the inferred result value.

Figure 3:
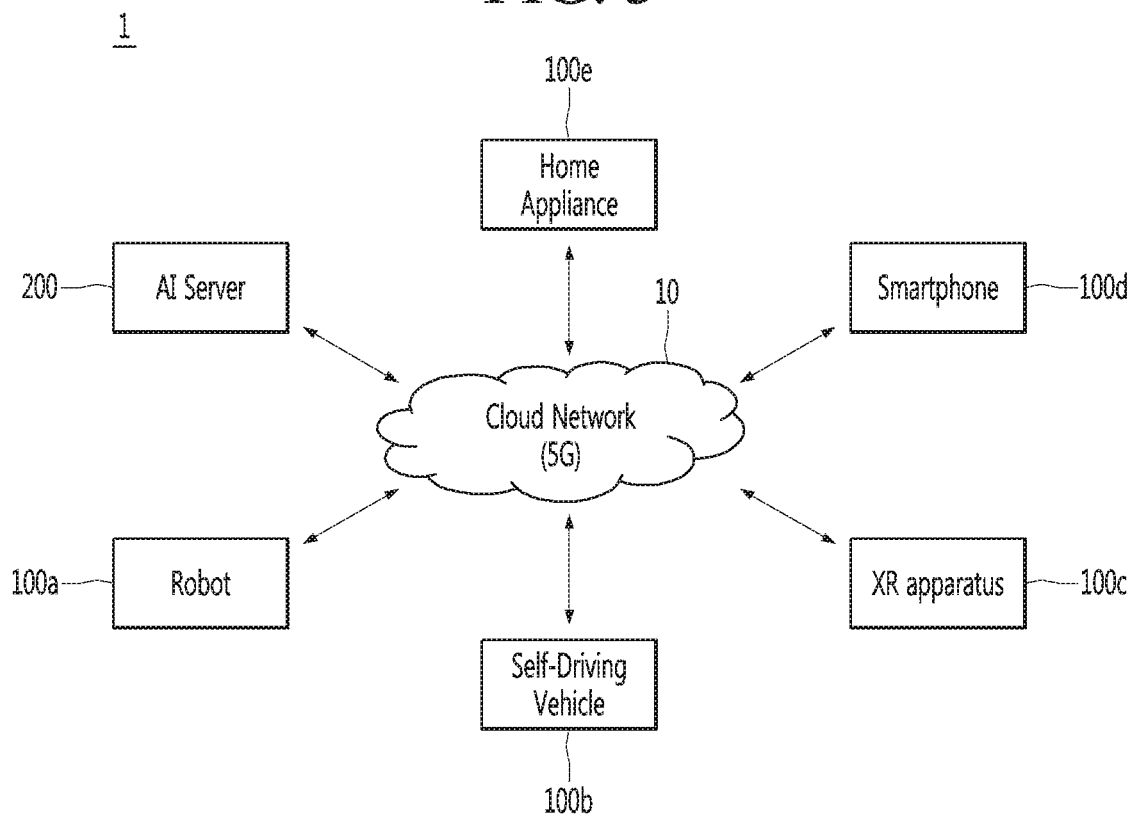
FIG. 3 illustrates an AI system according to an embodiment of the present disclosure.

FIG. 3 illustrates an AI system 1 according to an embodiment of the present invention.

Referring to FIG. 3, in the AI system 1, at least one of an AI server 200, a robot 100a, a self-driving vehicle 100b, an XR device 100c, a smartphone 100d, or a home appliance 100e is connected to a cloud network 10. The robot 100a, the self-driving vehicle 100b, the XR device 100c, the smartphone 100d, or the home appliance 100e, to which the AI technology is applied, may be referred to as AI devices 100a to 100e.

The cloud network 10 may refer to a network that forms part of a cloud computing infrastructure or exists in a cloud computing infrastructure. The cloud network 10 may be configured by using a 3G network, a 4G or LTE network, or a 5G network.

That is, the devices 100a to 100e and 200 configuring the AI system 1 may be connected to each other through the cloud network 10. In particular, each of the devices 100a to 100e and 200 may communicate with each other through a base station, but may directly communicate with each other without using a base station.

The AI server 200 may include a server that performs AI processing and a server that performs operations on big data.

The AI server 200 may be connected to at least one of the AI devices constituting the AI system 1, that is, the robot 100a, the self-driving vehicle 100b, the XR device 100c, the smartphone 100d, or the home appliance 100e through the cloud network 10, and may assist at least part of AI processing of the connected AI devices 100a to 100e.

At this time, the AI server 200 may learn the artificial neural network according to the machine learning algorithm instead of the AI devices 100a to 100e, and may directly store the learning model or transmit the learning model to the AI devices 100a to 100e.

At this time, the AI server 200 may receive input data from the AI devices 100a to 100e, may infer the result value for the received input data by using the learning model, may generate a response or a control command based on the inferred result value, and may transmit the response or the control command to the AI devices 100a to 100e.

Alternatively, the AI devices 100a to 100e may infer the result value for the input data by directly using the learning model, and may generate the response or the control command based on the inference result.

Hereinafter, various embodiments of the AI devices 100a to 100e to which the above-described technology is applied will be described. The AI devices 100a to 100e illustrated in FIG. 3 may be regarded as a specific embodiment of the AI device 100 illustrated in FIG. 1.

<AI+Robot>

The robot 100a, to which the AI technology is applied, may be implemented as a guide robot, a carrying robot, a cleaning robot, a wearable robot, an entertainment robot, a pet robot, an unmanned flying robot, or the like.

The robot 100a may include a robot control module for controlling the operation, and the robot control module may refer to a software module or a chip implementing the software module by hardware.

The robot 100a may acquire state information about the robot 100a by using sensor information acquired from various kinds of sensors, may detect (recognize) surrounding environment and objects, may generate map data, may determine the route and the travel plan, may determine the response to user interaction, or may determine the operation.

The robot 100a may use the sensor information acquired from at least one sensor among the lidar, the radar, and the camera so as to determine the travel route and the travel plan.

The robot 100a may perform the above-described operations by using the learning model composed of at least one artificial neural network. For example, the robot 100a may recognize the surrounding environment and the objects by using the learning model, and may determine the operation by using the recognized surrounding information or object information. The learning model may be learned directly from the robot 100a or may be learned from an external device such as the AI server 200.

At this time, the robot 100a may perform the operation by generating the result by directly using the learning model, but the sensor information may be transmitted to the external device such as the AI server 200 and the generated result may be received to perform the operation.

The robot 100a may use at least one of the map data, the object information detected from the sensor information, or the object information acquired from the external apparatus to determine the travel route and the travel plan, and may control the driving unit such that the robot 100a travels along the determined travel route and travel plan.

The map data may include object identification information about various objects arranged in the space in which the robot 100a moves. For example, the map data may include object identification information about fixed objects such as walls and doors and movable objects such as pollen and desks. The object identification information may include a name, a type, a distance, and a position.

In addition, the robot 100a may perform the operation or travel by controlling the driving unit based on the control/interaction of the user. At this time, the robot 100a may acquire the intention information of the interaction due to the user's operation or speech utterance, and may determine the response based on the acquired intention information, and may perform the operation.

<AI+Self-Driving>

The self-driving vehicle 100b, to which the AI technology is applied, may be implemented as a mobile robot, a vehicle, an unmanned flying vehicle, or the like.

The self-driving vehicle 100b may include a self-driving control module for controlling a self-driving function, and the self-driving control module may refer to a software module or a chip implementing the software module by hardware. The self-driving control module may be included in the self-driving vehicle 100b as a component thereof, but may be implemented with separate hardware and connected to the outside of the self-driving vehicle 100b.

The self-driving vehicle 100b may acquire state information about the self-driving vehicle 100b by using sensor information acquired from various kinds of sensors, may detect (recognize) surrounding environment and objects, may generate map data, may determine the route and the travel plan, or may determine the operation.

Like the robot 100a, the self-driving vehicle 100b may use the sensor information acquired from at least one sensor among the lidar, the radar, and the camera so as to determine the travel route and the travel plan.

In particular, the self-driving vehicle 100b may recognize the environment or objects for an area covered by a field of view or an area over a certain distance by receiving the sensor information from external devices, or may receive directly recognized information from the external devices.

The self-driving vehicle 100b may perform the above-described operations by using the learning model composed of at least one artificial neural network. For example, the self-driving vehicle 100b may recognize the surrounding environment and the objects by using the learning model, and may determine the traveling movement line by using the recognized surrounding information or object information. The learning model may be learned directly from the self-driving vehicle 100a or may be learned from an external device such as the AI server 200.

At this time, the self-driving vehicle 100b may perform the operation by generating the result by directly using the learning model, but the sensor information may be transmitted to the external device such as the AI server 200 and the generated result may be received to perform the operation.

The self-driving vehicle 100b may use at least one of the map data, the object information detected from the sensor information, or the object information acquired from the external apparatus to determine the travel route and the travel plan, and may control the driving unit such that the self-driving vehicle 100b travels along the determined travel route and travel plan.

The map data may include object identification information about various objects arranged in the space (for example, road) in which the self-driving vehicle 100b travels. For example, the map data may include object identification information about fixed objects such as street lamps, rocks, and buildings and movable objects such as vehicles and pedestrians. The object identification information may include a name, a type, a distance, and a position.

In addition, the self-driving vehicle 100b may perform the operation or travel by controlling the driving unit based on the control/interaction of the user. At this time, the self-driving vehicle 100b may acquire the intention information of the interaction due to the user's operation or speech utterance, and may determine the response based on the acquired intention information, and may perform the operation.

<AI+XR>

The XR device 100c, to which the AI technology is applied, may be implemented by a head-mount display (HMD), a head-up display (HUD) provided in the vehicle, a television, a mobile phone, a smartphone, a computer, a wearable device, a home appliance, a digital signage, a vehicle, a fixed robot, a mobile robot, or the like.

The XR device 100c may analyzes three-dimensional point cloud data or image data acquired from various sensors or the external devices, generate position data and attribute data for the three-dimensional points, acquire information about the surrounding space or the real object, and render to output the XR object to be output. For example, the XR device 100c may output an XR object including the additional information about the recognized object in correspondence to the recognized object.

The XR device 100c may perform the above-described operations by using the learning model composed of at least one artificial neural network. For example, the XR device 100c may recognize the real object from the three-dimensional point cloud data or the image data by using the learning model, and may provide information corresponding to the recognized real object. The learning model may be directly learned from the XR device 100c, or may be learned from the external device such as the AI server 200.

At this time, the XR device 100c may perform the operation by generating the result by directly using the learning model, but the sensor information may be transmitted to the external device such as the AI server 200 and the generated result may be received to perform the operation.

<AI+Robot+Self-Driving>

The robot 100a, to which the AI technology and the self-driving technology are applied, may be implemented as a guide robot, a carrying robot, a cleaning robot, a wearable robot, an entertainment robot, a pet robot, an unmanned flying robot, or the like.

The robot 100a, to which the AI technology and the self-driving technology are applied, may refer to the robot itself having the self-driving function or the robot 100a interacting with the self-driving vehicle 100b.

The robot 100a having the self-driving function may collectively refer to a device that moves for itself along the given movement line without the user's control or moves for itself by determining the movement line by itself.

The robot 100a and the self-driving vehicle 100b having the self-driving function may use a common sensing method so as to determine at least one of the travel route or the travel plan. For example, the robot 100a and the self-driving vehicle 100b having the self-driving function may determine at least one of the travel route or the travel plan by using the information sensed through the lidar, the radar, and the camera.

The robot 100a that interacts with the self-driving vehicle 100b exists separately from the self-driving vehicle 100b and may perform operations interworking with the self-driving function of the self-driving vehicle 100b or interworking with the user who rides on the self-driving vehicle 100b.

At this time, the robot 100a interacting with the self-driving vehicle 100b may control or assist the self-driving function of the self-driving vehicle 100b by acquiring sensor information on behalf of the self-driving vehicle 100b and providing the sensor information to the self-driving vehicle

100*b*, or by acquiring sensor information, generating environment information or object information, and providing the information to the self-driving vehicle 100*b*.

Alternatively, the robot 100*a* interacting with the self-driving vehicle 100*b* may monitor the user boarding the self-driving vehicle 100*b*, or may control the function of the self-driving vehicle 100*b* through the interaction with the user. For example, when it is determined that the driver is in a drowsy state, the robot 100*a* may activate the self-driving function of the self-driving vehicle 100*b* or assist the control of the driving unit of the self-driving vehicle 100*b*. The function of the self-driving vehicle 100*b* controlled by the robot 100*a* may include not only the self-driving function but also the function provided by the navigation system or the audio system provided in the self-driving vehicle 100*b*.

Alternatively, the robot 100*a* that interacts with the self-driving vehicle 100*b* may provide information or assist the function to the self-driving vehicle 100*b* outside the self-driving vehicle 100*b*. For example, the robot 100*a* may provide traffic information including signal information and the like, such as a smart signal, to the self-driving vehicle 100*b*, and automatically connect an electric charger to a charging port by interacting with the self-driving vehicle 100*b* like an automatic electric charger of an electric vehicle.

<AI+Robot+XR>

The robot 100*a*, to which the AI technology and the XR technology are applied, may be implemented as a guide robot, a carrying robot, a cleaning robot, a wearable robot, an entertainment robot, a pet robot, an unmanned flying robot, a drone, or the like.

The robot 100*a*, to which the XR technology is applied, may refer to a robot that is subjected to control/interaction in an XR image. In this case, the robot 100*a* may be separated from the XR device 100*c* and interwork with each other.

When the robot 100*a*, which is subjected to control/interaction in the XR image, may acquire the sensor information from the sensors including the camera, the robot 100*a* or the XR device 100*c* may generate the XR image based on the sensor information, and the XR device 100*c* may output the generated XR image. The robot 100*a* may operate based on the control signal input through the XR device 100*c* or the user's interaction.

For example, the user can confirm the XR image corresponding to the time point of the robot 100*a* interworking remotely through the external device such as the XR device 100*c*, adjust the self-driving travel path of the robot 100*a* through interaction, control the operation or driving, or confirm the information about the surrounding object.

<AI+Self-Driving+XR>

The self-driving vehicle 100*b*, to which the AI technology and the XR technology are applied, may be implemented as a mobile robot, a vehicle, an unmanned flying vehicle, or the like.

The self-driving driving vehicle 100*b*, to which the XR technology is applied, may refer to a self-driving vehicle having a means for providing an XR image or a self-driving vehicle that is subjected to control/interaction in an XR image. Particularly, the self-driving vehicle 100*b* that is subjected to control/interaction in the XR image may be distinguished from the XR device 100*c* and interwork with each other.

The self-driving vehicle 100*b* having the means for providing the XR image may acquire the sensor information from the sensors including the camera and output the generated XR image based on the acquired sensor information. For example, the self-driving vehicle 100*b* may include an HUD to output an XR image, thereby providing a passenger with a real object or an XR object corresponding to an object in the screen.

At this time, when the XR object is output to the HUD, at least part of the XR object may be outputted so as to overlap the actual object to which the passenger's gaze is directed. Meanwhile, when the XR object is output to the display provided in the self-driving vehicle 100*b*, at least part of the XR object may be output so as to overlap the object in the screen. For example, the self-driving vehicle 100*b* may output XR objects corresponding to objects such as a lane, another vehicle, a traffic light, a traffic sign, a two-wheeled vehicle, a pedestrian, a building, and the like.

When the self-driving vehicle 100*b*, which is subjected to control/interaction in the XR image, may acquire the sensor information from the sensors including the camera, the self-driving vehicle 100*b* or the XR device 100*c* may generate the XR image based on the sensor information, and the XR device 100*c* may output the generated XR image. The self-driving vehicle 100*b* may operate based on the control signal input through the external device such as the XR device 100*c* or the user's interaction.

Figure 4:
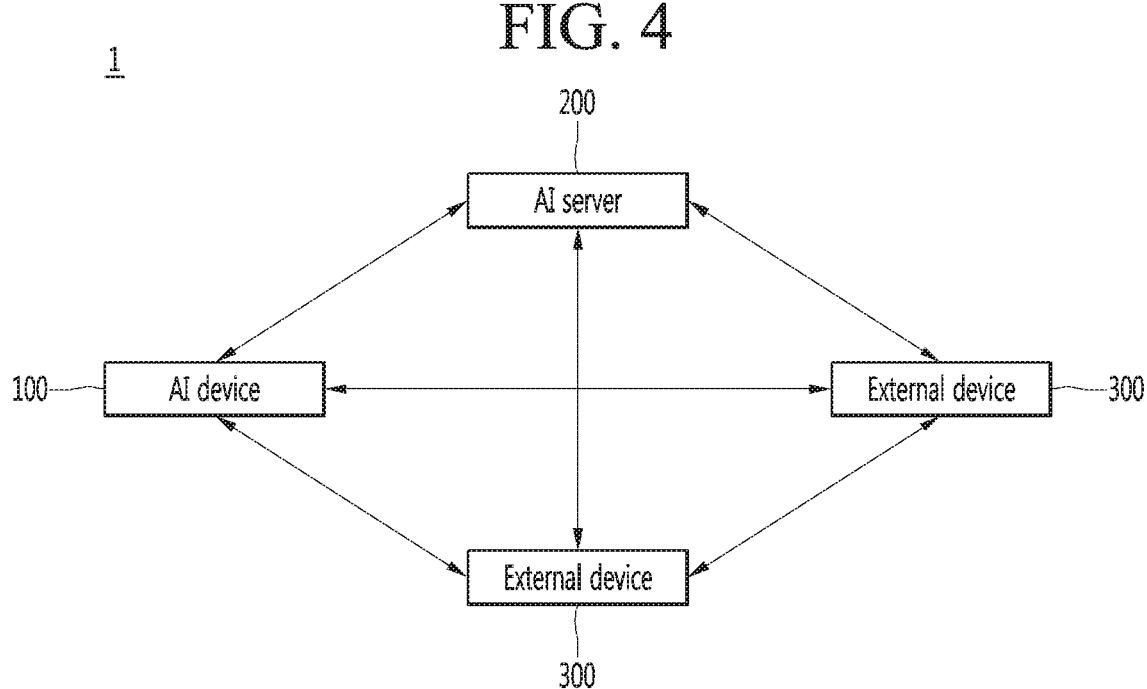
FIG. 4 is a diagram illustrating an example of an AI system according to an embodiment of the present disclosure.

FIG. 4 is a diagram illustrating an example of an AI system according to an embodiment of the present disclosure.

Referring to FIG. 4, an artificial intelligence system 1 may include an artificial intelligence device 100, an artificial intelligence server 200, and an external device 300.

The artificial intelligence device 100, the artificial intelligence server 200, and the external device 300 may communicate with one another using wired or wireless communication technology.

In addition, the AI device 100 may store identification information of the external device 300. The AI device 100 may identify each of at least one or more external devices 300.

The external device 300 may include a robot capable of traveling and moving by itself. For example, the external device 300 may include a robot capable of recognizing a user's speech and performing guide in a public place such as an airport.

In addition, the external device 300 may transmit or receive data to or from the AI device 100 directly or through the artificial intelligence server 200.

Figure 5:
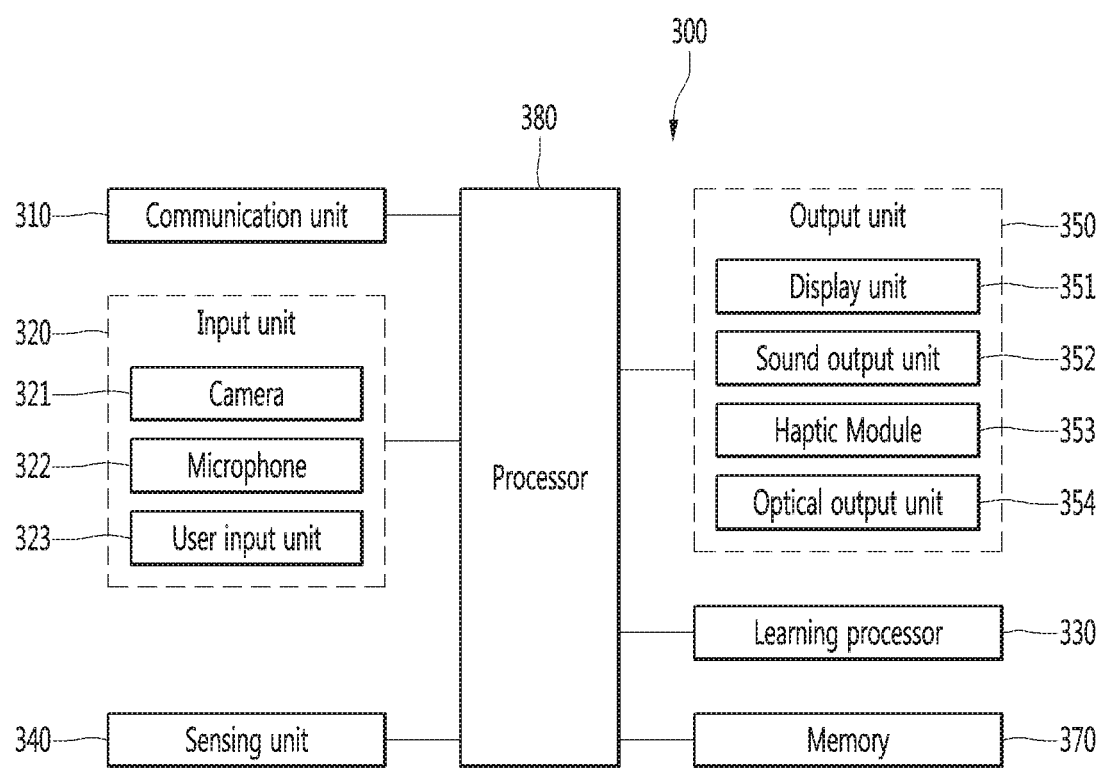
FIG. 5 illustrates an external device according to an embodiment of the present disclosure.

FIG. 5 illustrates an external device 300 according to an embodiment of the present disclosure.

A description overlapping FIG. 1 will be omitted.

The input unit 320 may include a camera 321 for receiving a video signal, a microphone 322 for receiving an audio signal, and a user input unit 323 for receiving information from a user.

The camera 321 may process image frames of still images or moving images obtained by image sensors in a video call more or an image capture mode. The processed image frames can be displayed on the display 151 or stored in memory 170.

The microphone 322 processes an external acoustic signal into electrical audio data. The processed audio data may be variously used according to function (application program) executed in the external apparatus 300. Meanwhile, the microphone 322 may include various noise removal algorithms to remove noise generated in the process of receiving the external acoustic signal.

The user input unit 323 receives information from a user. When information is received through the user input unit 323, the processor 180 may control operation of the external apparatus 300 in correspondence with the input information.

The user input unit 323 may include one or more of a mechanical input element (for example, a mechanical key, a button located on a front and/or rear surface or a side surface of the external apparatus 300, a dome switch, a jog wheel, a jog switch, and the like) or a touch input element. As one example, the touch input element may be a virtual key, a soft key or a visual key, which is displayed on a touchscreen through software processing, or a touch key located at a location other than the touchscreen.

The output unit 350 is typically configured to output various types of information, such as audio, video, tactile output, and the like. The output unit 350 may include a display 351, an audio output module 352, a haptic module 353, and a light output unit 354.

The display 351 is generally configured to display (output) information processed in the external apparatus 300. For example, the display 351 may display execution screen information of an application program executed by the external apparatus 300 or user interface (UI) and graphical user interface (GUI) information according to the executed screen information.

The display 351 may have an inter-layered structure or an integrated structure with a touch sensor in order to realize a touchscreen. The touchscreen may provide an output interface between the external apparatus 300 and a user, as well as function as the user input unit 123 which provides an input interface between the external apparatus 300 and the user.

The audio output module 352 is generally configured to output audio data received from the communication unit 110 or stored in the memory 170 in a call signal reception mode, a call mode, a record mode, a speech recognition mode, a broadcast reception mode, and the like.

The audio output module 352 may also include a receiver, a speaker, a buzzer, or the like.

A haptic module 353 can be configured to generate various tactile effects that a user feels. A typical example of a tactile effect generated by the haptic module 353 is vibration.

A light output unit 354 may output a signal for indicating event generation using light of a light source of the external apparatus 300. Examples of events generated in the external apparatus 300 may include message reception, call signal reception, a missed call, an alarm, a schedule notice, email reception, information reception through an application, and the like.

On the other hand, the external device 300 may include an audio signal generator (not shown) for generating an audio signal to be output to a speaker of the sound output unit 252. The processor 380 may control the audio signal generated by the audio signal generator to be output to the sound output unit 252 of the external device 300.

Meanwhile, when the audio signal is output to the speaker of the external device 300, an echo phenomenon may occur since the microphone of the external device 300 again receives the audio signal output through the speaker.

Therefore, the external device 300 may further include an audio board (not shown) that performs echo cancellation to prevent the echo phenomenon.

The audio board may obtain a first audio signal generated by the audio signal generator through an audio cable. The first audio signal input to the audio board through the audio cable may be referred to as a reference signal for echo cancellation. In this case, the reference signal may be an audio signal in the time domain.

In addition, the audio board may obtain a second audio signal received by the microphone of the external device 300. The audio board may perform echo cancellation using the first audio signal and the second audio signal.

Figure 6:
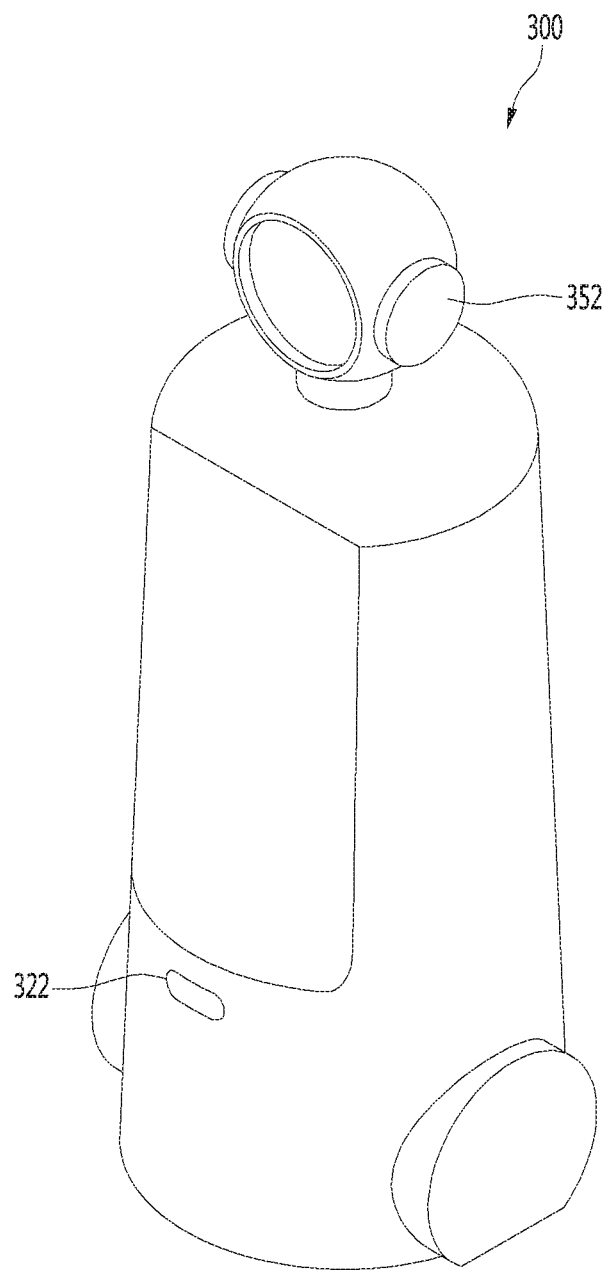
FIG. 6 is an exemplary diagram of an external device according to an embodiment of the present disclosure.

FIG. 6 is an exemplary diagram of an external device 300 according to an embodiment of the present disclosure.

The external device 300 may be a robot capable of interacting with a user with speech. The external device 300 may be a robot that travels by itself and serves to provide path guide to the user.

The external device 300 may include at least one sound output unit 352 in a head-shaped body. For example, the sound output unit 352 may be installed at both sides of the head-shaped body. In this case, the sound output unit 352 may include a speaker.

In addition, the external device 300 may include at least one microphone 322 in the head-shaped body in order to receive an external sound. For example, at least one microphone 322 may be installed on the front of the body. In addition, the external device 300 may store at least one or more spare microphones 322 on the back of the main body, and when a failure occurs in another microphone 322, it may be used to replace the failed microphone.

Figure 7:
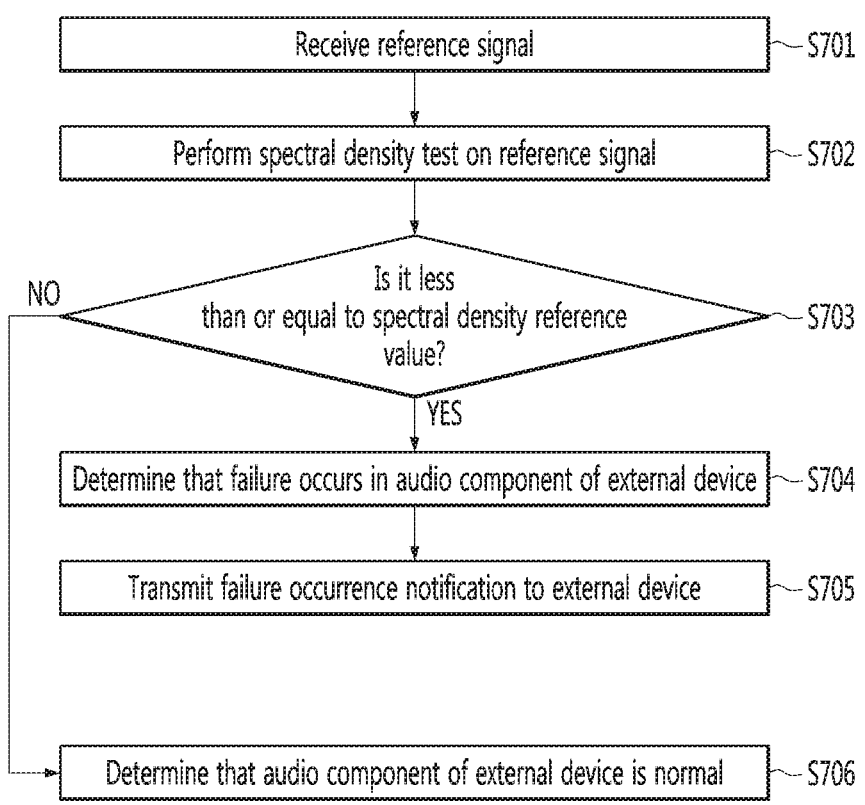
FIG. 7 is a flowchart for describing a method of diagnosing a failure using a reference signal according to an embodiment of the present disclosure.

FIG. 7 is a flowchart for describing a method of diagnosing a failure using a reference signal according to an embodiment of the present disclosure.

The communication unit 110 may receive a reference signal in a time domain for echo cancellation of the external device 300 (S701).

The communication unit 110 may be called a communication interface.

When a failure occurs in an audio cable of the external device 300, a problem may occur that a reference signal for echo cancellation is not properly input to the audio board of the external device 300. Therefore, the AI device 100 may receive a reference signal for echo cancellation from the external device 300 and perform test on the reference signal to diagnose whether a failure occurs in the audio cable of the external device 300.

Figure 8:
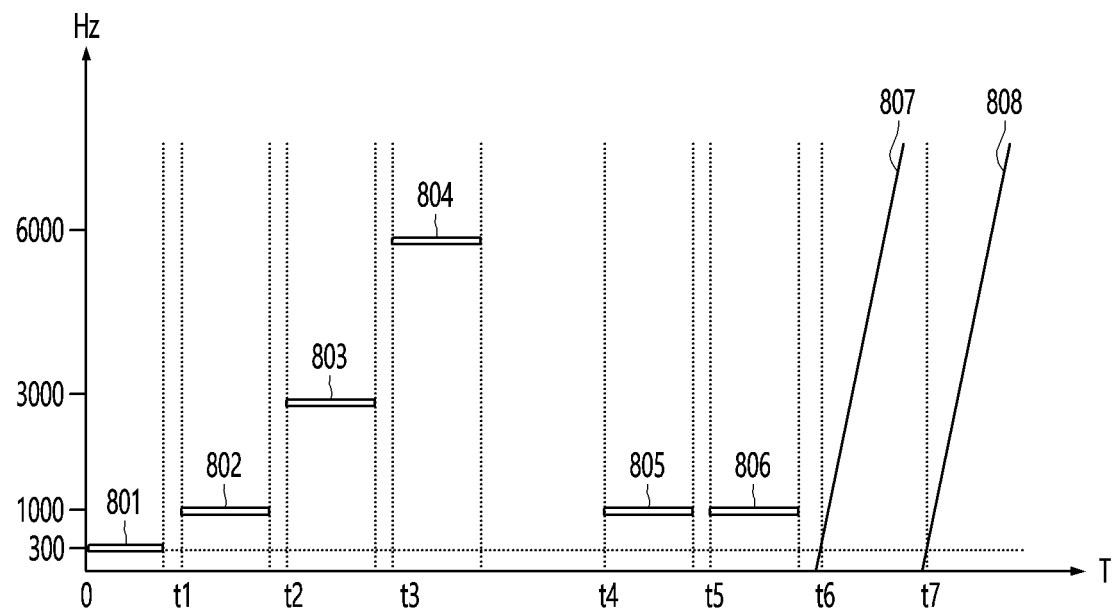
FIG. 8 is a diagram showing a reference signal according to an embodiment of the present disclosure.

FIG. 8 is a diagram showing a reference signal according to an embodiment of the present disclosure.

The reference signal may include at least one of a tone signal with a constant amplitude level which continues at a predetermined frequency, a sweep signal whose the frequency increases at a predetermined frequency rate per unit time, and a white noise signal including a frequency component in a predetermined range.

For example, referring to FIG. 8, the reference signal may include at least one of a tone signal 801 with a frequency of 300 Hz, a tone signal 802, 805 or 806 with a frequency of 1000 Hz, a tone signal 803 with a frequency of 3000 Hz, and a tone signal 804 with a frequency of 6000 Hz and a sweep signal 807 or 808 whose the frequency increases at a predetermined frequency rate per unit time.

The reference signal may be a reference signal in a time domain. The reference signal in the time domain may be expressed in units of time (ms) or in units of frames (frame).

On the other hand, the memory 170 may store information on a time point at which a predetermined frequency needs to be detected for each signal included in each reference signal. The time point at which a frequency needs to be detected may be information received through the communication unit 110. In addition, the time point may be expressed in units of time or in units of frames.

For example, referring to FIG. 8, the time points at which a frequency of 300 hz needs to be detected may be 0 ('start time point'), $t_6$, and $t_7$. The time points at which a frequency of 1000 hz needs to be detected may be $t_1$, $t_4$, and $t_5$. In addition, the time point at which a frequency of 3000 Hz needs to be detected may be $t_2$. In addition, the time point at which a frequency of 6000 Hz needs to be detected may be $t_3$.

The processor 180 may perform a spectral density test on the reference signal (S702).

The spectral density may include a power spectral density.

The processor 180 may determine whether a spectral density at least one test target frequency is less than or equal to or a preset spectral density reference value at at least one test target time point based on the reference signal in the time domain.

For example, when the test target frequency is 300 Hz, it may be determined whether a spectral density of 300 Hz is less than or equal to the preset spectral density reference value at the test target time point. On the other hand, the test target time point may be a time point at which a frequency of 300 Hz needs to be detected. For example, the time point may be 0 ('start time'), $t_6$ and $t_7$. Therefore, it is possible to determine whether or not a power spectral density of 300 Hz at 0 ('start time'), $t_6$ and $t_7$ is less than or equal to the preset spectral density reference value.

For example, when the reference signal generated by an audio signal generator of the external device 300 is not properly input to the audio board due to a failure of an audio cable, the processor 180 may determine whether a power spectral density of 300 Hz at the test target time points 0, $t_6$, and $t_7$ is less than or equal to the preset spectral density reference value.

On the other hand, a recording start time for the reference signal input to the audio board may be delayed due to a delay in loading a software driver of the audio board of the external device 300. Therefore, the processor 180 may perform correction based on the recording start time for the test target time point.

Figure 9:
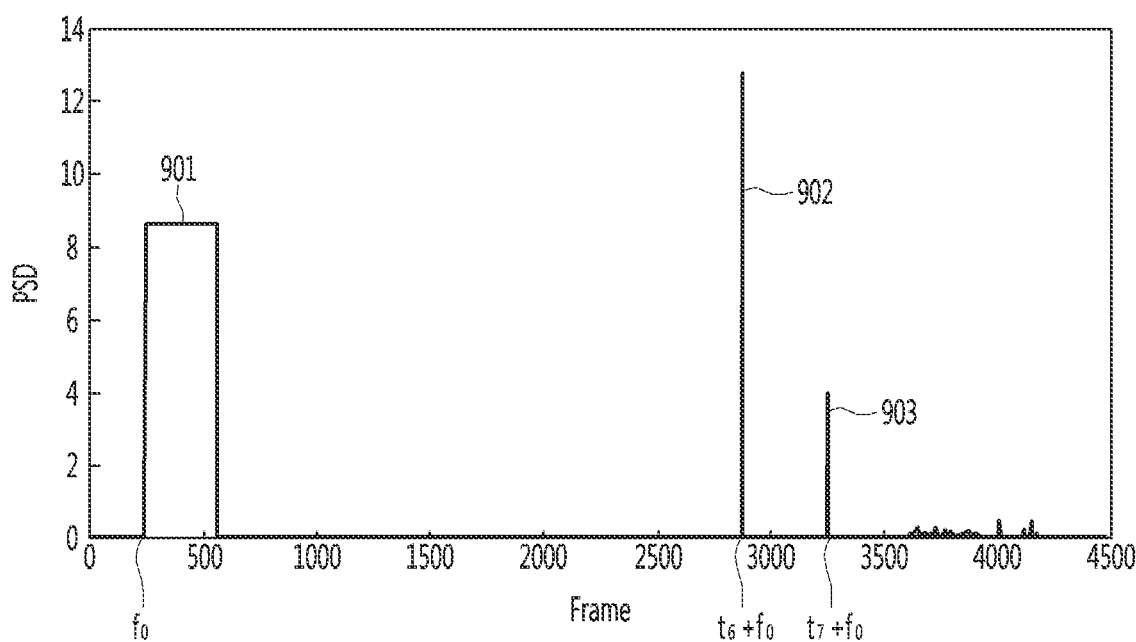
FIG. 9 illustrates a power spectral density of a reference signal according to an embodiment of the present disclosure.

Referring to FIG. 9, FIG. 9 is a graph in which the power spectral density value of 300 Hz of the reference signal of FIG. 8 is represented by the y-axis and the unit of frame is represented by the x-axis.

Referring to the power spectral density graph of 300 Hz of FIG. 9, the power spectral density of 300 Hz should be larger than by a predetermined value from 0 frame, but the recording start time for the reference signal may be delayed by $f_0$ due to a delay in loading the software driver of the audio board of the external device 300.

Therefore, the processor 180 may obtain a recording start time $f_0$ and correct the test target time point.

The processor 180 may determine the recording start time at which the reference signal in the time domain starts to be recorded.

The processor 180 may convert the reference signal in the time domain into that in the frequency domain. For example, the processor 180 may convert a reference signal in the time domain into a reference signal in the frequency domain by using a short-time Fourier transform (STFT).

In addition, the processor 180 may obtain a start frequency at which the reference signal in the time domain starts.

For example, referring to FIG. 8, the processor 180 may obtain a frequency of 300 Hz of the tone signal 801 at which the reference signal starts, as a start frequency.

In addition, the processor 180 may determine that the time point at which the spectral density of the start frequency starts to exceed the preset spectral density reference value with respect to the reference signal in the frequency domain as the recording start time at which the reference signal in the time domain starts to be recorded.

For example, referring to FIG. 9, the processor 180 may record a time point $f_0$ at which the spectral density of the start frequency 300 Hz starts to exceed 6, which is the preset spectral density reference value with respect to the reference signal in the frequency domain, as the recording start time point at which the reference signal in the time domain starts to be recorded.

In addition, the processor 180 may determine whether the spectral density of at least one test target frequency is less than or equal to a preset spectral density reference value at the test target time point corrected based on the recording start time point with respect to the reference signal in the frequency domain (S703).

For example, when the processor 180 determines whether the power spectral density of 300 Hz at the three test target time points 0, $t_6$, and $t_7$ is less than or equal to the preset spectral density reference value, the processor 180 may correct the test target time point based on the recording start time point $f_0$. The corrected test target time points may be $0+f_0$, $t_6+f_0$, and $t_7+f_0$.

The processor 180 may determine whether the power spectral density of the test target frequency 300 Hz is less than or equal to a preset spectral density reference value at the test target time points $0+f_0$, $t_6+f_0$, and $t_7+f_0$ that are corrected based on the recording start time.

For example, when the preset spectral density reference value is 14, the processor 180 may determine that the power spectral density at the corrected test target time points $0+f_0$, $t_6+f_0$, and $t_7+f_0$ is less than or equal to the reference value.

In addition, the processor 180 may determine whether the power spectral density of each of the plurality of test target frequencies 300 Hz, 1000 Hz, 3000 Hz, and 6000 Hz is less than or equal to the preset spectral density reference value.

Meanwhile, when the power spectral density of the test target frequency is less than or equal to the preset spectral density reference value at the test target time point, the processor 180 may determine that a failure occurs in an audio component of the external device 300 (S704).

In addition, Meanwhile, when the power spectral density of the test target frequency is less than or equal to the preset spectral density reference value at the test target time point, the processor 180 may determine that a failure occurs in an audio cable of the external device 300.

The processor 180 may transmit a failure occurrence notification for the audio cable to the external device 300 through the communication device 110 (S705).

On the other hand, when the power spectral density of the test target frequency is not less than or equal to the preset spectral density reference value at the test target time point, the processor 180 may determine that the audio component of the external device 300 is normal (S706).

Figure 10:
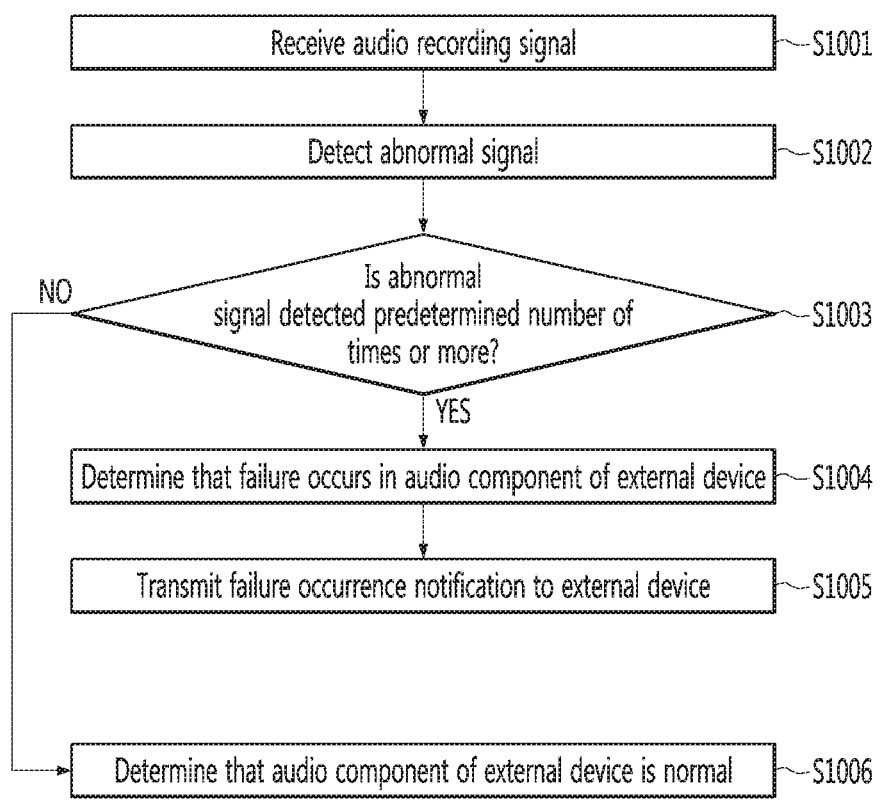
FIG. 10 is a flowchart for describing a method of diagnosing a failure using an audio recording signal according to an embodiment of the present disclosure.

FIG. 10 is a flowchart for describing a method of diagnosing a failure using an audio recording signal according to an embodiment of the present disclosure.

The communication unit 110 may receive an audio recording signal obtained by recording the audio signal output from the speaker of a sound output unit 350 of the external device 300 by a microphone 322 of an input unit 320 of the external device 300 (S1001).

When a failure occurs in an audio board of the external device 300, an abnormal signal may be included in the audio recording signal recorded by the microphone 322 of the external device 300.

The audio signal output from the speaker of the sound output unit 350 of the external device 300 may include a tone signal with a constant amplitude level that continues at a predetermined frequency.

Therefore, the AI device 100 may diagnose whether a failure occurs in the audio board by receiving the audio recording signal from the external device 300 and detecting an abnormal signal.

In addition, the audio recording signal may be a signal obtained by recording the audio signal output from the speaker of the sound output unit 350 of the external device 300 by the microphone 322 of the input unit 320 of the external device 300.

For example, the external device 300 may obtain external sound through the microphone 322, when a magnitude of the external sound is less than or equal to a predetermined magnitude, determine that environment is suitable for testing, and start recording of the audio signal output from the speaker.

Figure 11:
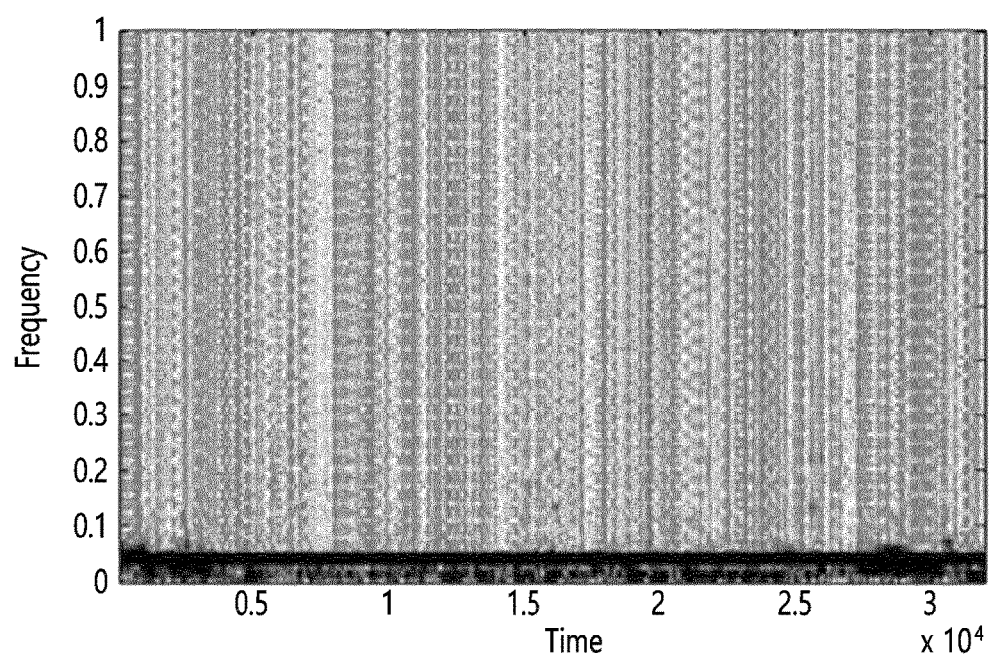
FIG. 11 is a diagram showing an audio recording signal according to an embodiment of the present disclosure.

FIG. 11 is a diagram showing an audio recording signal according to an embodiment of the present disclosure.

Referring to FIG. 11, the audio recording signal may include a tone signal with a constant tone of a low frequency. The tone signal may include a periodic signal as a sine or cosine function. The audio recording signal may include a noise signal when a failure occurs in an audio board of the external device 300.

The processor 180 may detect an abnormal signal that deviates from a preset maximum inclination value with respect to the audio recording signal (S1002).

The processor 180 may measure the maximum amplitude of the audio recording signal.

The processor 180 may set the measured maximum amplitude as the maximum inclination value of the audio recording signal.

The processor 180 may obtain a differential value of the audio recording signal.

The processor 180 may obtain a differential value of the audio recording signal by obtaining a periodic signal of a cosine or sine function, by differentially calculating the audio recording signal including a tone signal which is a periodic signal of a sine or cosine function.

The processor 180 may detect a signal of which a differential value of the audio recording signal exceeds the maximum inclination value, as an abnormal signal.

Figure 12:
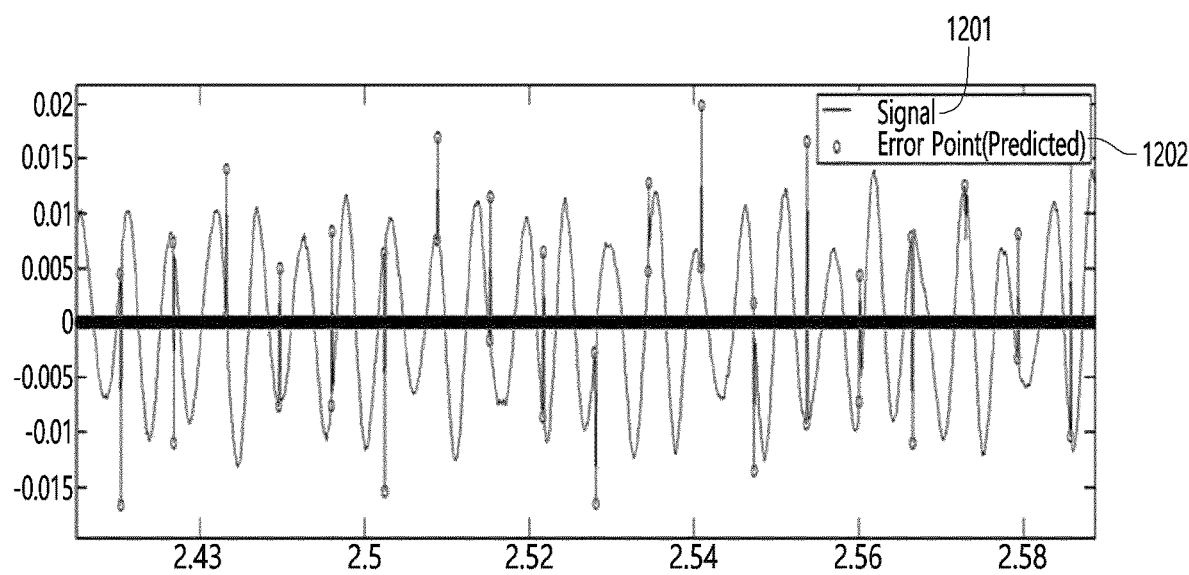
FIG. 12 is a diagram for describing a process of detecting an abnormal signal according to an embodiment of the present disclosure.

Referring to FIG. 12, the processor 180 may detect an abnormal signal (Error Point) 1202 of a periodic signal (Signal) 1201 of a cosine or sine function obtained by differentially calculating the audio recording signal, as the abnormal signal.

The processor 180 may determine whether at least one detected abnormal signal is detected a predetermined number of times or more (S1003).

The processor 180 may determine whether there is an abnormality in the audio recording signal according to whether a predetermined number of abnormal signals or more are detected from the audio recording signal.

For example, the processor 180 may detect an abnormal signal that deviates from the maximum inclination value based on the audio recording signal, and determine that there is an abnormality in the audio recording signal when at least one or more detected abnormal signals is detected a predetermined number of times or more.

When it is determined that there is an abnormality in the audio recording signal, the processor 180 may determine that a failure occurs with respect to an audio component of the external device 300 (S1004).

On the other hand, when it is determined that there is an abnormality in the audio recording signal, the processor 180 may determine that a failure occurs with respect to an audio board of the external device.

The communication unit 110 may transmit a failure occurrence notification for the audio board to the external device 300 (S1005).

On the other hand, when the detected abnormal signal is not detected a predetermined number of times or more, the processor 180 may determine that the audio component of the external device 300 is normal (S1006).

Figure 13:
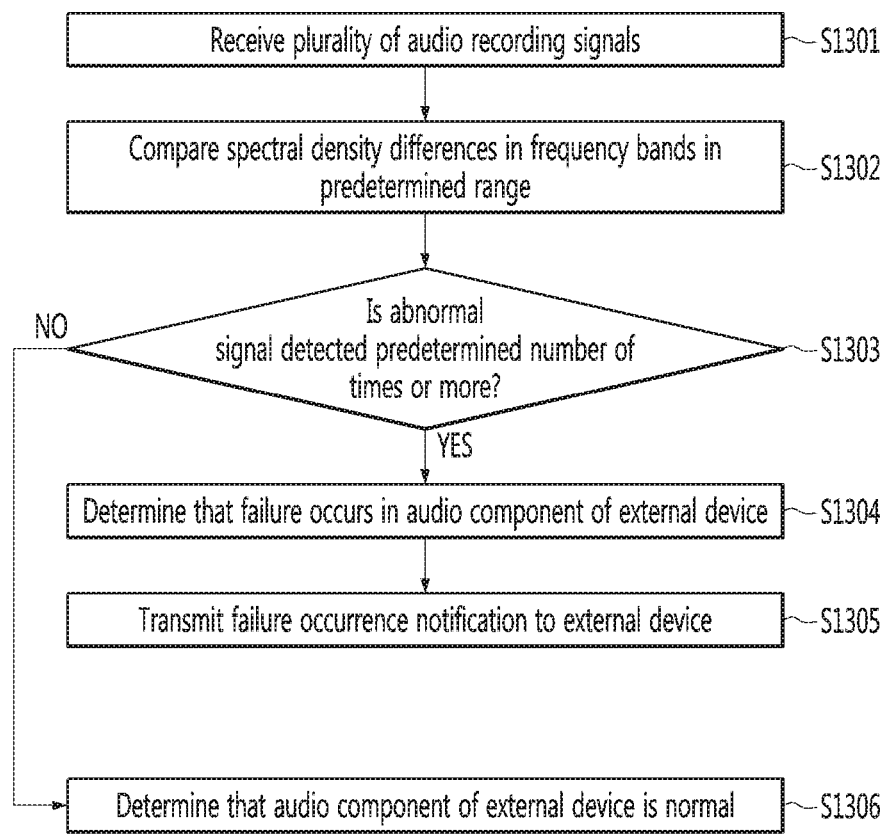
FIG. 13 is a flowchart of a method of diagnosing a failure using a plurality of audio recording signals according to an embodiment of the present disclosure.

FIG. 13 is a flowchart of a method of diagnosing a failure using a plurality of audio recording signals according to an embodiment of the present disclosure.

The communication unit 110 may receive a plurality of audio recording signals obtained by respectively recording an audio signal output from a speaker of the external device by a plurality of microphones of the external device (S1301).

In this case, the plurality of audio recording signals may include a sweep signal of which a frequency increases at a predetermined frequency rate per unit time or a white noise signal including a frequency component in a predetermined range.

The processor 180 may compare spectral density differences in a frequency band of a predetermined range (S1302).

In addition, the processor 180 may determine whether the spectral density difference is greater than or equal to a preset reference value (S1303).

For example, the processor 180 may compare power spectral density differences in the range of a preset frequency band with respect to each of a plurality of audio recording signals.

When each power spectral density difference is greater than or equal to a preset reference value, the processor 180 may determine that a failure occurs in at least one of the plurality of microphones of the external device 300 (S1304).

Figure 14:
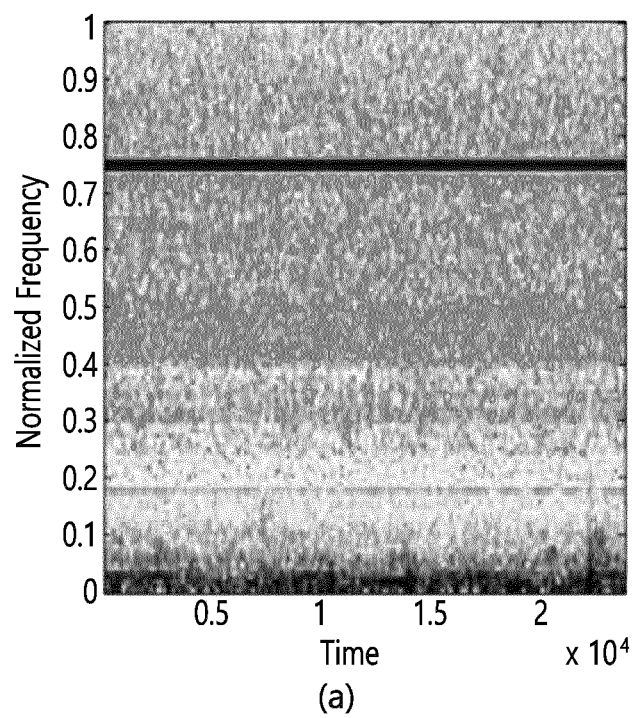
FIGS. 14A and 14B respectively show a plurality of audio recording signals according to an embodiment of the present disclosure.
Figure 14:
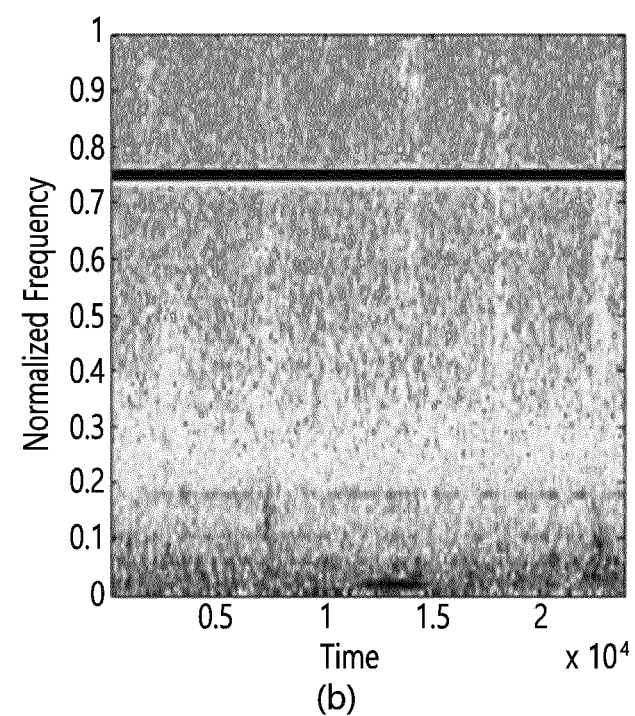

In FIGS. 14A and 14B, there are shown a first audio recording signal (a) and a second audio recording signal (b) input to and recorded by two microphones.

The first audio recording signal and the second audio recording signal may include a sweep signal of which the frequency increases at a predetermined frequency rate per unit time.

Figure 15:
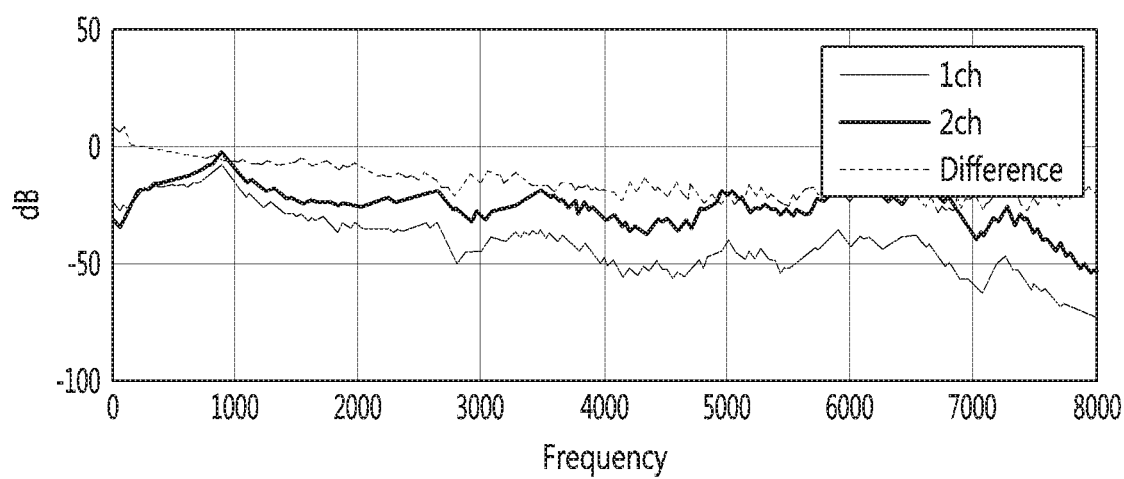
FIG. 15 is a diagram showing a table comparing differences in spectral densities of a plurality of audio recording signals according to an embodiment of the present disclosure.

Referring to FIG. 15, the processor 180 may compare power spectral densities in frequency bands of a predetermined range of 0 Hz to 8000 Hz with respect to each of the first audio recording signal 1$ch$ and the second audio recording signal 2$ch$ and obtain power spectral density differences.

In this case, when each power spectral density difference is greater than or equal to a preset reference value, the processor 180 may determine that a failure occurs in at least one of the plurality of microphones of the external device.

For example, when one of the two microphones of the external device 300 does not properly perform recording, the power spectral density difference of each of the two audio recording signals may be higher than a reference value. Therefore, the processor 180 may diagnose that there is a failure in the microphone of the external device.

The communication unit 180 may transmit a notification indicating that a failure of at least one of the plurality of microphones has occurred to the external device (S1305).

When the external device 300 receives the notification indicating that a failure has occurred in at least one of the microphones, the external device 300 may replace the failed microphone with a spare microphone.

The processor 180 may determine that the plurality of microphones of the external device are normal when the power spectral density difference is not greater than or equal to the preset reference value.

On the other hand, the communication unit 110 may receive a start word recording signal obtained by recording a start word spoken through a speaker of the external device 300 by the microphone of the external device 300. In this case, echo cancellation processing of the external device 300 may be in an off state.

The processor 180 may perform speech recognition on the start word recording signal received using an STT engine. In this case, when the speech recognition is not performed on the received start word recording signal, the processor 180 may determine that a failure has occurred in the microphone of the external device 300. Alternatively, the processor 180 may determine that the microphone of the external device 300 is normal when the speech recognition is performed on the received start word recording signal by the start word that is expected normally.

In addition, the processor 180 may measure signal distortion of the received start word recording signal and evaluate the quality of the received start word recording signal through a Perceptual Evaluation of Speech Quality (PESQ) value.

According to the embodiment of the present disclosure, it is possible to diagnose a failure of a microphone or an audio board of an external device and transmit a failure occurrence notification.

Furthermore, according to the various embodiments of the present disclosure, it is possible to diagnose a failure of a microphone of an external device and transmit a failure occurrence notification.

Furthermore, according to the various embodiments of the present disclosure, it is possible to remotely diagnose a failure of an external device and easily repairing the external device without the help of an expert.

The present disclosure may be embodied as computer-readable codes on a program-recorded medium. The computer-readable recording medium may be any recording medium that can store data which can be thereafter read by a computer system. Examples of the computer-readable medium may include a hard disk drive (HDD), a solid state disk (SSD), a silicon disk drive (SDD), a ROM, a RAM, a CD-ROM, a magnetic tape, a floppy disk, and an optical data storage device. The computer may also include the control unit 180 of the artificial intelligence apparatus.

What is claimed is:

1. An artificial intelligence device comprising:
   a communication interface configured to receive a reference signal in a time domain for echo cancellation of an external device; and
   a processor configured to determine whether a spectral density at at least one test target frequency is less than or equal to a preset spectral density reference value at at least one test target time point and determine that a failure has occurred in an audio component when the spectral density is less than or equal to the preset spectral density reference value,
   wherein the communication interface receives a plurality of audio recording signals obtained by recording an audio signal output from a speaker of the external device by a plurality of microphones of the external device, and
   wherein the processor is configured to perform comparison with a spectral density difference in a frequency band in a predetermined range with respect to the plurality of audio recording signals, and determine that a failure has occurred in at least one of the plurality of microphones of the external device when the spectral density difference is greater than or equal to a preset reference value.

2. The artificial intelligence device of claim 1, wherein the processor is configured to:
   convert the reference signal in the time domain into a reference signal in a frequency domain, obtain a start frequency at which the reference signal in the time domain starts, and determine a time point at which a spectral density of the start frequency starts to exceed the preset spectral density reference value with respect to the reference signal in the frequency domain as a recording start time point at which the reference signal in the time domain starts to be recorded, and
   determine whether the spectral density at the at least one test target frequency is less than or equal to the preset spectral density reference value at a test target time point corrected based on the recording start time point and determine that a failure has occurred in the audio component of the external device when the spectral density is less than or equal to the preset spectral density reference value.

3. The artificial intelligence device of claim 2, wherein the processor is configured to determine that a failure has occurred in an audio cable of the external device when the spectral density is less than or equal to the preset spectral density reference value, and
   wherein the communication interface transmits a failure occurrence notification for the audio cable to the external device.

4. The artificial intelligence device of claim 1,
   wherein the processor is configured to detect an abnormal signal which deviates from a preset maximum inclination value with respect to an audio recording signal of the plurality of audio recording signals, determine whether there is an abnormality in the audio recording signal according to whether a predetermined number or more of abnormal signals are detected, and determine that a failure has occurred in the audio component of the external device when it is determined that there is the abnormality in the audio recording signal.

5. The artificial intelligence device of claim 4, wherein the processor is configured to measure a maximum amplitude of the audio recording signal to set the maximum amplitude to the maximum inclination value, and detect a signal of which a differential value of the audio recording signal exceeds the maximum inclination value as the abnormal signal.

6. The artificial intelligence device of claim 4, wherein the processor is configured to determine that a failure has occurred in an audio board of the external device when it is determined that there is the abnormality in the audio recording signal, and
   wherein the communication interface transmits a failure occurrence notification for the audio board to the external device.

7. The artificial intelligence device of claim 4, wherein the audio signal is a signal with a constant amplitude level that lasts at a predetermined frequency.

8. The artificial intelligence device of claim 1, wherein the plurality of audio recording signals are each a sweep signal of which a frequency increases at a predetermined frequency rate per unit time or a white noise signal comprising a frequency component in a predetermined range.

9. A method of diagnosing a failure, the method comprising:
   receiving a reference signal in a time domain for echo cancellation of an external device;

determining whether a spectral density at at least one test target frequency is less than or equal to a preset spectral density reference value at at least one test target time point; and determining that a failure has occurred in an audio component when the spectral density is less than or equal to the preset spectral density reference value, wherein the method further comprises:

receiving a plurality of audio recording signals obtained by recording an audio signal output from a speaker of the external device by a plurality of microphones of the external device;

performing comparison with a spectral density difference in a frequency band in a predetermined range with respect to the plurality of audio recording signals; and determining that a failure has occurred in at least one of the plurality of microphones of the external device when the spectral density difference is greater than or equal to a preset reference value.

10. The method of claim 9, wherein the determining whether the spectral density is less than or equal to the preset spectral density reference value includes converting the reference signal in the time domain into a reference signal in a frequency domain, obtaining a start frequency at which the reference signal in the time domain starts, determining a time point at which a spectral density of the start frequency starts to exceed the preset spectral density reference value with respect to the reference signal in the frequency domain as a recording start time point at which the reference signal in the time domain starts to be recorded, determining whether the spectral density at the at least one test target frequency is less than or equal to the preset spectral density reference value at a test target time point corrected based on the recording start time point, and determining that a failure has occurred in the audio component of the external device when the spectral density is less than or equal to the preset spectral density reference value.

11. The method of claim 10, wherein the determining that the failure has occurred in the audio component of the external device includes determining that a failure has occurred in an audio cable of the external device when the spectral density is less than or equal to the preset spectral density reference value, and wherein the method further comprises transmitting a failure occurrence notification for the audio cable to the external device.

12. The method of claim 9, further comprising:

detecting an abnormal signal which deviates from a preset maximum inclination value with respect to an audio recording signal of the plurality of audio recording signals;

determining whether there is an abnormality in the audio recording signal according to whether a predetermined number or more of abnormal signals are detected; and determining that a failure has occurred in the audio component of the external device when it is determined that there is the abnormality in the audio recording signal.

13. The method of claim 12, wherein the detecting the abnormal signal includes measuring a maximum amplitude of the audio recording signal to set the maximum amplitude to the maximum inclination value, and detecting a signal of which a differential value of the audio recording signal exceeds the maximum inclination value as the abnormal signal.

14. The method of claim 12, further comprising:

determining that a failure has occurred in an audio board of the external device when it is determined that there is the abnormality in the audio recording signal; and transmitting a failure occurrence notification for the audio board to the external device.

15. The method of claim 12, wherein the audio signal is a signal with a constant amplitude level that lasts at a predetermined frequency.

16. The method of claim 9, wherein the plurality of audio recording signals are each a sweep signal of which a frequency increases at a predetermined frequency rate per unit time or a white noise signal comprising a frequency component in a predetermined range.

17. An artificial intelligence device comprising:

a communication interface configured to receive a reference signal in a time domain for echo cancellation of an external device; and a processor configured to determine whether a spectral density at at least one test target frequency is less than or equal to a preset spectral density reference value at at least one test target time point and determine that a failure has occurred in an audio component when the spectral density is less than or equal to the preset spectral density reference value, wherein the processor is configured to:

convert the reference signal in the time domain into a reference signal in a frequency domain, obtain a start frequency at which the reference signal in the time domain starts, and determine a time point at which a spectral density of the start frequency starts to exceed the preset spectral density reference value with respect to the reference signal in the frequency domain as a recording start time point at which the reference signal in the time domain starts to be recorded, and determine whether the spectral density at the at least one test target frequency is less than or equal to the preset spectral density reference value at a test target time point corrected based on the recording start time point and determine that a failure has occurred in the audio component of the external device when the spectral density is less than or equal to the preset spectral density reference value.

18. The artificial intelligence device of claim 17, wherein the processor is configured to determine that a failure has occurred in an audio cable of the external device when the spectral density is less than or equal to the preset spectral density reference value, and wherein the communication interface transmits a failure occurrence notification for the audio cable to the external device.

* * * * *